US 8,714,959 B2

(12) United States Patent
Worz et al.

(10) Patent No.: US 8,714,959 B2
(45) Date of Patent: May 6, 2014

(54) MOLD FOR PRODUCING MOLDED BLOCKS AND DEVICE FOR PRODUCING MOLDED BLOCKS

(71) Applicant: Rampf Formen GmBH, Allmendingen (DE)

(72) Inventors: Andreas Worz, Blaustein (DE); Tom Griffith, Barrie (CA)

(73) Assignee: Rampf Molds Industries, Inc., Hagerstown, MD (US)

(*) Notice: Subject to any disclaimer, the term of this patent is extended or adjusted under 35 U.S.C. 154(b) by 0 days.

(21) Appl. No.: 13/650,552

(22) Filed: Oct. 12, 2012

(65) Prior Publication Data

US 2013/0040013 A1    Feb. 14, 2013

Related U.S. Application Data

(63) Continuation of application No. PCT/EP2011/001914, filed on Apr. 15, 2011.

(30) Foreign Application Priority Data

Apr. 16, 2010 (DE) .......................... 10 2010 015 516
Aug. 6, 2010 (DE) .......................... 10 2010 033 678

(51) Int. Cl.
  *B28B 7/10* (2006.01)
  *B28B 7/36* (2006.01)
(52) U.S. Cl.
  USPC ........... 425/214; 425/412; 425/421; 425/422; 425/441; 425/471
(58) Field of Classification Search
  USPC ......... 425/214, 363, 371, 412, 413, 421, 422, 425/432, 441, 471
  See application file for complete search history.

(56) References Cited

U.S. PATENT DOCUMENTS

| | | | | |
|---|---|---|---|---|
| 3,917,774 A | * | 11/1975 | Sagane et al. ................. | 425/371 |
| 4,290,248 A | * | 9/1981 | Kemerer et al. ........... | 52/309.16 |
| 4,856,976 A | * | 8/1989 | Rook et al. .................... | 425/413 |
| 5,082,438 A | * | 1/1992 | Rook et al. .................... | 425/413 |
| 5,458,477 A | * | 10/1995 | Kemerer et al. .............. | 425/371 |
| 5,700,495 A | * | 12/1997 | Kemerer et al. .............. | 425/371 |
| 7,021,919 B2 | | 4/2006 | Griffith | |

FOREIGN PATENT DOCUMENTS

| | | |
|---|---|---|
| AT | 507 211 A4 | 3/2010 |
| GB | 273448 A | 7/1927 |

OTHER PUBLICATIONS

International Search Report and Written Opinion dated Sep. 7, 2011.

* cited by examiner

*Primary Examiner* — James Mackey
(74) *Attorney, Agent, or Firm* — Burr & Brown, PLLC

(57) ABSTRACT

A mold, for producing molded blocks with at least one lateral face which has a texture, comprises a mold lower part and at least one flexible belt, wherein the flexible belt surrounds at least one mold wall of the mold lower part that delimits a mold cavity of the mold lower part in order to act on the material for producing the molded block that is received in the mold cavity, to impress a texture on at least one of the lateral faces of the molded block, wherein the flexible belt is moveable relative to the mold lower part and is mounted in such a way that the flexible belt moves around the mold wall when the molded block is ejected from the mold cavity. The mold comprises an active auxiliary device by means of which a rolling resistance of the flexible belt can be varied.

20 Claims, 12 Drawing Sheets

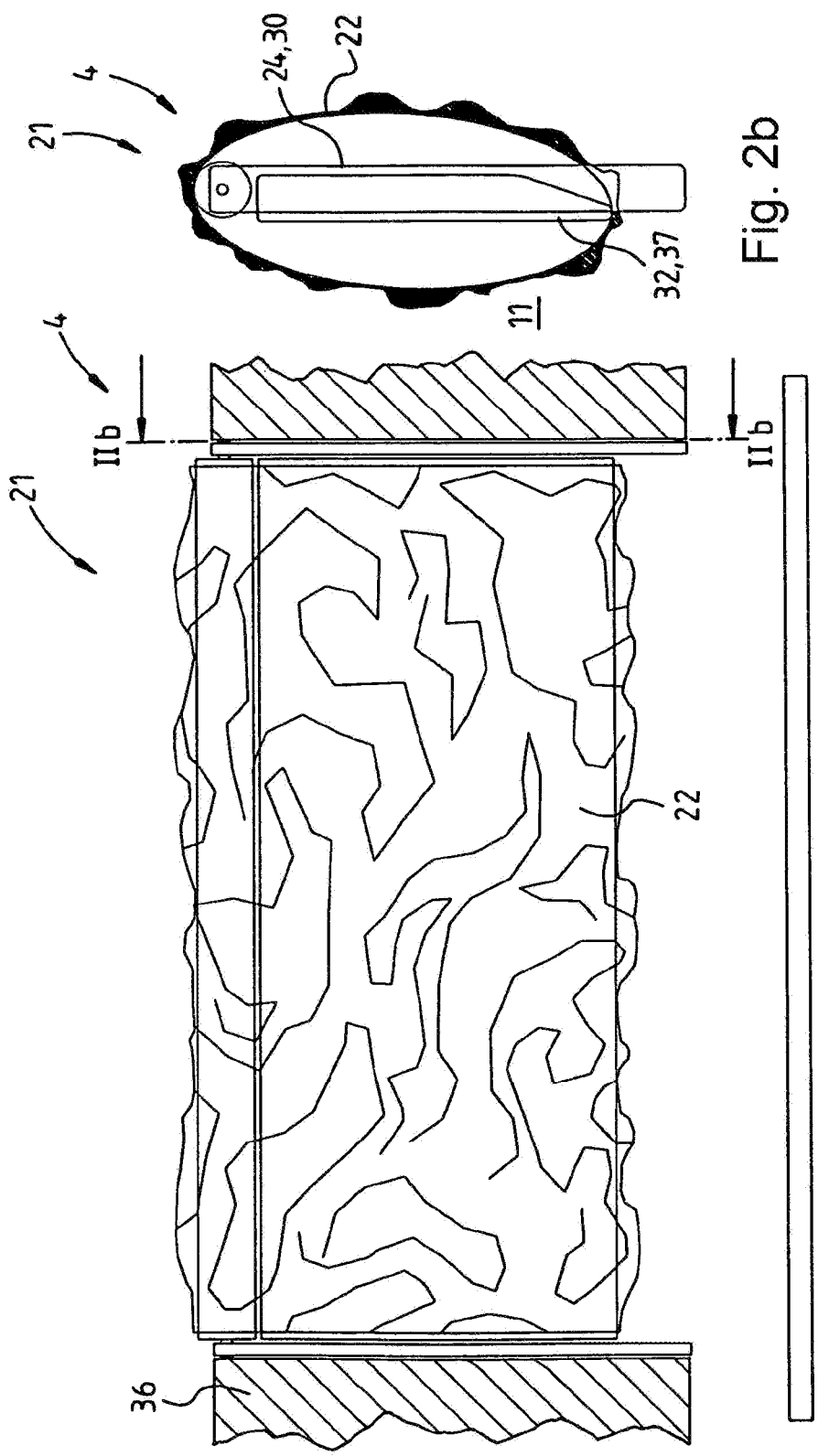

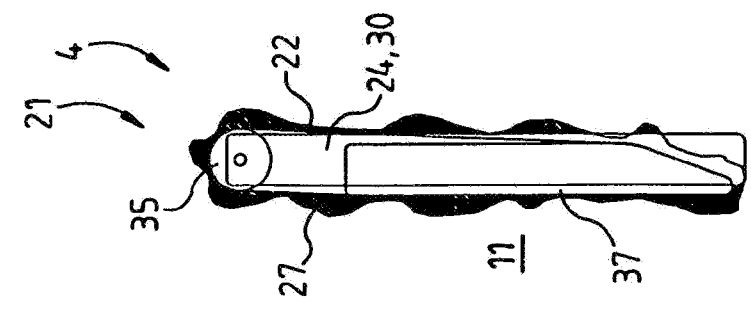
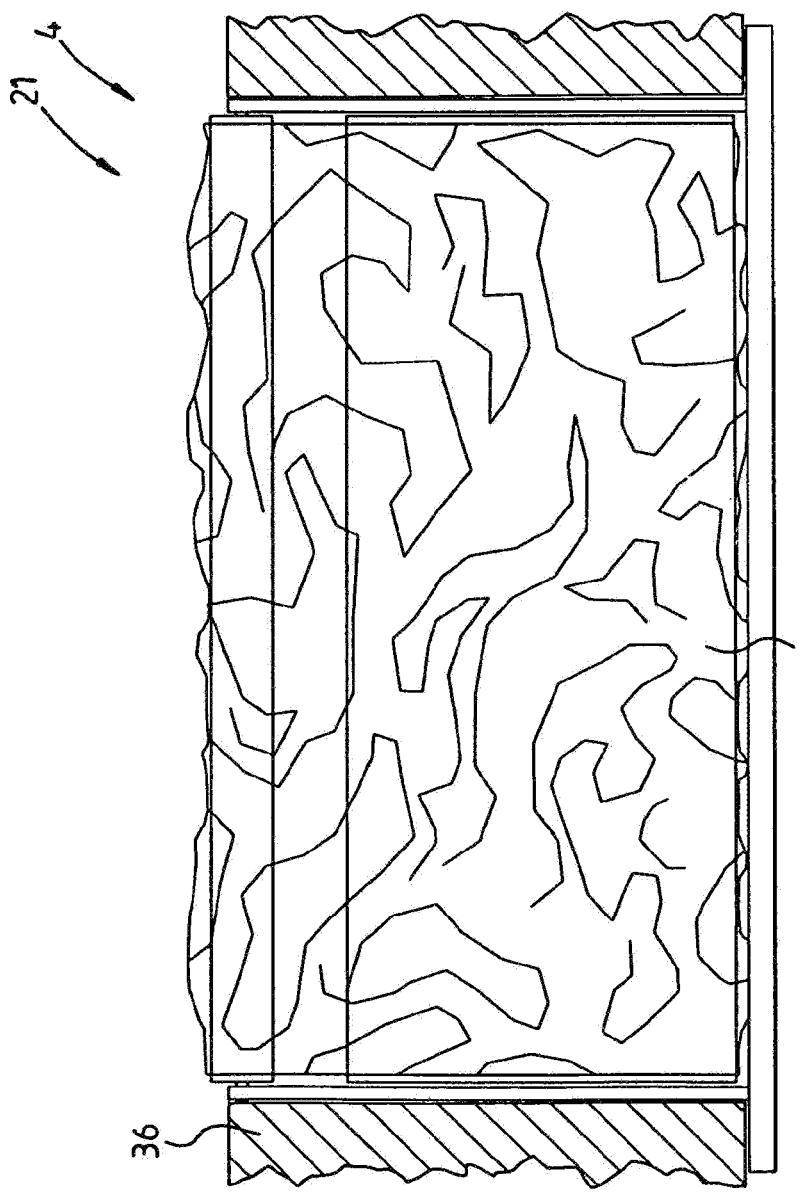

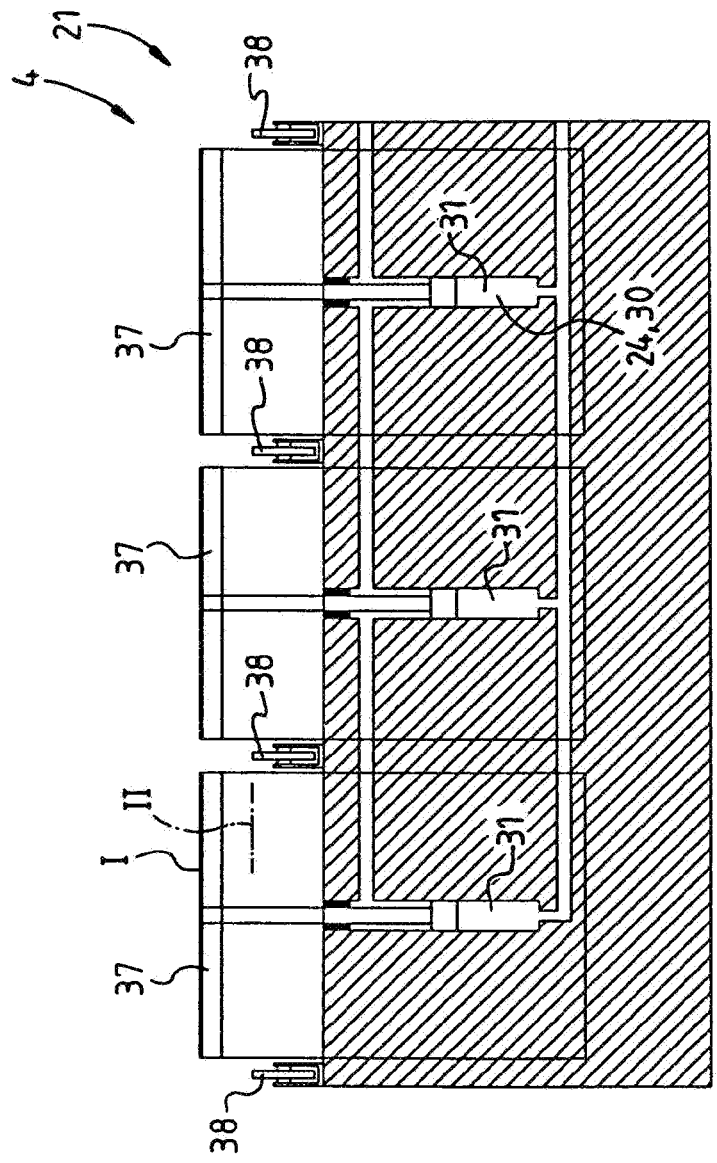
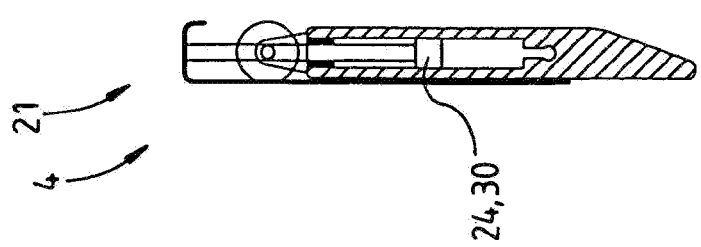
Fig. 3b
Fig. 3a

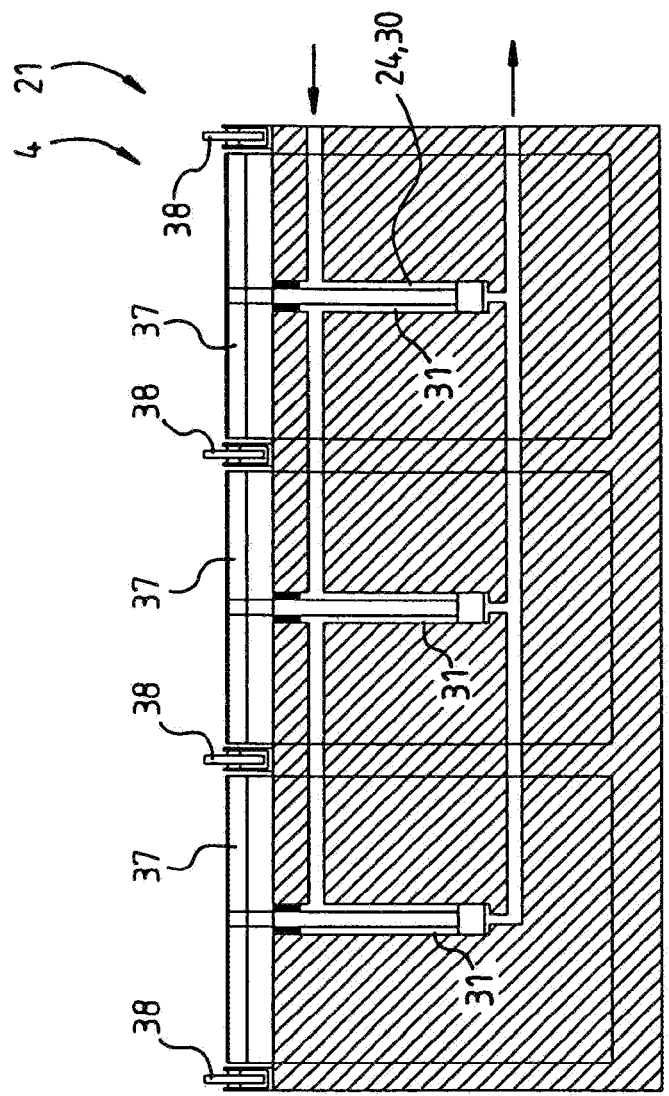
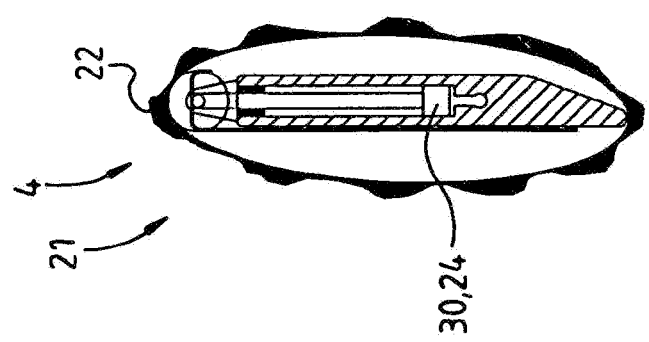
Fig. 3f
Fig. 3e

MOLD FOR PRODUCING MOLDED BLOCKS AND DEVICE FOR PRODUCING MOLDED BLOCKS

CROSS REFERENCE TO RELATED APPLICATIONS

This application is a continuation of International Application No. PCT/EP2011/001914 filed Apr. 15, 2011, which designated the United States, and claims the benefit under 35 USC §119(a)-(d) of German Application Nos. 10 2010 015 516.0 filed Apr. 16, 2010 and 10 2010 033 678.5 filed Aug. 6, 2010, the entireties of which are incorporated herein by reference.

FIELD OF THE INVENTION

The invention relates to a mold for producing molded blocks and a device for producing molded blocks.

BACKGROUND OF THE INVENTION

A mold for producing molded blocks is known from U.S. Pat. No. 7,021,919 B2. This mold for producing molded blocks with at least one lateral face which has a texture comprises a mold cavity which has openings at its opposite ends in order to receive a material for producing a molded block through its upper opening and to discharge through its lower opening a molded block formed in the mold cavity from the material, and furthermore comprises at least one flexible belt, wherein the flexible belt surrounds at least one mold wall of the mold lower part that delimits the mold cavity in order to act on the material for producing the molded block that is received in the mold cavity, and in order in so doing to impress a texture on at least one of the lateral faces of the molded block, wherein the flexible belt can be moved relative to the mold lower part and wherein the flexible belt is mounted in such a way that it moves around the mold wall when the molded block is ejected from the mold cavity. Such a mold or a device which operates with such a mold is intended to be improved in terms of the quality of the imprinted surface portion of the molded blocks produced.

SUMMARY OF THE INVENTION

It is an object of the invention to propose a mold or a device in which the texture on the surface portion of the molded block is not damaged during stripping.

The present invention makes provision to equip the mold with an active auxiliary device by means of which a rolling resistance of the flexible belt can be varied. As a result, it is possible during the ejection or stripping of the molded block formed in the mold cavity to avoid a relative movement between the molded block and the flexible belt that impairs the texture of the molded block, since, given a reduction in the rolling resistance of the flexible belt, the molded block must transmit by way of its imprinted texture at best small forces on the flexible belt in order to cause the flexible belt to run around the mold wall while the mold lower part is drawn off upwardly from the molded block. The essence of the invention is therefore to avoid shear forces between the texture formed into the molded block and the texture of the flexible belt bearing against it by means of an active auxiliary device which facilitates a rotation or a rolling of the flexible belt around the mold wall after a filling and compaction of the material such that, for stripping, a substantially lower force is sufficient in order to move the flexible belt. By switching between a difficulty of movement of the flexible belt during filling and compaction to an ease of movement of the flexible belt during demolding, it is possible that the belt has optimum properties for each of the three manufacturing steps of filling, compaction and stripping. During filling and compaction, the difficulty of movement of the flexible belt prevents an unwanted displacement of the belt through the material flowing into the mold cavity or through the compaction of the material situated in the mold cavity, it being the case that any displacement of the belt would result in an impairment of the desired structure of the molded block. During stripping, the ease of movement of the belt prevents any tearing or displacement of the texture imprinted on the molded block. While the molded block is ejected from the mold cavity, the active auxiliary device brings about a reduction in the rolling resistance of the flexible belt which the latter puts up to rolling around the mold wall, and consequently it is possible to achieve a reduction in a drive force which must be transmitted from the molded block to the flexible belt during ejection in order to rotate the belt around the mold wall.

According to the present invention, provision is made to equip the active auxiliary device with a tensioning device by means of which a tension of the flexible belt can be varied, wherein the flexible belt is held in a tensioned position during a filling of the mold cavity and during a compaction of the material in the mold cavity, and wherein the flexible belt is loosened into a relaxed position by the tensioning device during the stripping or ejection from the mold cavity of the molded block formed from the material. By means of a tensioning or relaxing operation which can be implemented in a mechanically simple manner, the force which is required to rotate or roll the flexible belt around the mold wall can be controlled in steps or steplessly by changing the tensioning force. Here, the tensioning device is formed in particular by one or more tensioning elements which are formed in particular as slide pieces or tensioning rollers, wherein the tensioning element or elements tension the flexible belt with at least two tensioning forces of different sizes.

Furthermore, provision is made according to the invention to equip the active auxiliary device with a drive device by means of which the flexible belt is driven during the stripping or ejection from the mold cavity of the molded block formed from the material, wherein the drive device comprises in particular at least one drive means which is formed in particular as a drive roller. With such a design of the auxiliary device, it is possible to reduce to a minimum the forces which are transmitted between the molded block and the flexible belt during stripping if the belt is driven by the drive device with exactly the speed with which the mold lower part is lifted away from the molded block during stripping, wherein the mold lower part and a portion of the flexible belt that bears against the molded block move in opposite directions. To achieve an effective drive, there is provided in particular a toothing between the flexible belt and the at least one drive means. As a result, unwanted slipping is avoided during driving.

Furthermore, the invention provides to equip the active auxiliary device with a releasable brake by means of which the flexible belt is blocked during filling and compaction or braked and by means of which the flexible belt is released in its rotation about the mold wall during the stripping or ejection of the molded block formed from the material. As a result, it is possible to allow a behavior of the flexible belt that is optimally tailored to the requirements during the manufacturing steps of filling, compaction and stripping. In such a design variant of the mold, it is provided in particular to guide the flexible belt at opposite ends of the mold wall over smooth-running rollers so as to require low driving forces for the belt in the unbraked state of the belt.

Furthermore, the invention provides to provide the flexible belt with cavities, wherein the cavities are arranged in particular in regions in which a thickness of the flexible belt lies above an average thickness of the flexible belt and is in particular more than 1.5 times the average thickness of the flexible belt. As a result, the belt obtains over its whole length a uniform flexibility which is independent of its thickness at individual points. This leads to a uniform circulation behavior in which, independently of the respective position of the belt, an approximately uniform drive force is sufficient to rotate the belt.

The present invention also provides to embed in the flexible belt round cords which run annularly around the mold wall which the belt surrounds, wherein the round cords are embedded in particular over the whole width of the flexible belt and in particular have identical spaces from one another. The round cords make it possible to avoid a constriction of the flexible belt such that the latter has a uniform expansion behavior over its whole width and as a result can imprint its texture on the molded block without distortion in the edge regions.

According to the present invention, provision is furthermore made to design the flexible belt with a first inner layer and a second outer layer, wherein the outer layer forms the texture and wherein the inner layer forms a sliding belt with a uniform thickness. As a result, it is possible to form the belt optimally from the requirements of uniform sliding or rolling around the mold wall and impressing a distortion-free texture on the molded block.

According to the invention, the mold comprises a seal which bears against the flexible belt in the region of the upper opening of the mold cavity in order to upwardly seal the mold cavity filled with material together with the pressure piece acting on the material. As a result, optimum sealing of the pressure piece of the punch and the mold lower part is achieved in particular in the region of the flexible belt.

Furthermore, the invention provides to equip the mold with a strip which, during filling and compaction, seals the lower opening of the mold cavity toward the mold wall which is surrounded by the flexible belt, and forms a bevel on the resulting molded block, wherein the strip is moved out of the mold cavity for stripping the molded block. This makes it possible for an edge of the molded block to be produced that adjoins the belt in the region of the production bed to be formed with a bevel and to avoid the formation of a burr.

The invention also provides to equip the mold with a pressing device which bears against the flexible belt when the molded block is ejected from the mold cavity. As a result, a smooth running of the flexible belt is achieved and its tension in the load strand is made more uniform during demolding.

The device according to the present invention for producing molded blocks comprises a block molding machine and a mold with a mold lower part for use in the block molding machine and a mold upper part, wherein the block molding machine comprises a vibrating table on which the mold lower part rests during filling and compaction, wherein the block molding machine comprises a vertically moveable load to which the mold upper part is fastened, wherein the mold lower part can likewise be moved in the vertical direction by the block molding machine. Such a block molding machine having a correspondingly designed mold makes it possible to produce molded blocks having a texture of high quality.

For the purposes of the present invention, a texture or a textured lateral face is understood to mean a lateral face with elevations and depressions, wherein the elevations and depressions extend with their normals perpendicular to a direction in which the molded block is demolded from the mold lower part.

BRIEF DESCRIPTION OF THE INVENTION

Further details of the invention are described in the drawing with reference to schematically illustrated exemplary embodiments.

FIGS. 2a-2d show a second exemplary embodiment of an active auxiliary device which comprises a tensioning device;

FIGS. 3a-3h show a third exemplary embodiment of an active auxiliary device which comprises a tensioning device;

DETAILED DESCRIPTION OF THE INVENTION

Figure 1A:
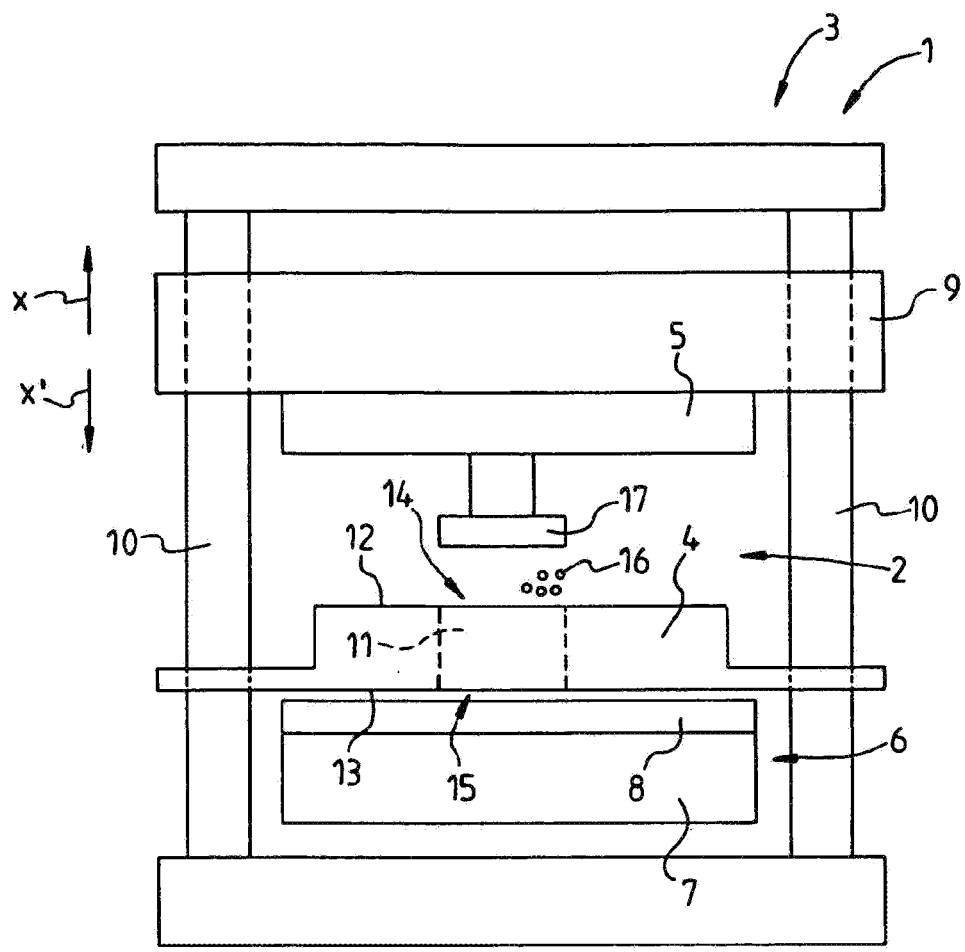
FIG. 1a shows a schematic view of a device for producing molded blocks which comprises a block molding machine and a mold.

FIG. 1a depicts in a schematic side view a block molding machine 1 in which the mold 2 according to the invention is used, wherein a device 3 according to the invention comprises the block molding machine 1 and the mold 2. The mold 2 comprises a mold lower part 4 and a mold upper part 5. The block molding machine 1 comprises a mold bed 6 which substantially consists of a vibrating table 7 and a production board 8. Furthermore, the block molding machine 1 comprises a load 9 to which the mold upper part 5 is fastened and by means of which the mold upper part 5 can be moved in vertical directions x, x'. The mold lower part 4 can likewise be moved on columns 10 of the block molding machine 1 in the vertical directions x, x'. In order to fill a mold cavity 11 formed in the mold lower part 4 using a filling carriage (not shown), the mold lower part 4 lies on the production board 8 which itself rests on the vibrating table 7. At opposite ends 12, 13 of the mold lower part 4, the mold cavity 11 has an upper opening 14 and a lower opening 15. During filling, material 16, which preferably takes the form of concrete, is filled through the upper opening 14 into the mold cavity (11) in order then to be compacted by means of vibrating the vibrating table 7 and by means of pressure which is applied by a pressure piece 17 of the mold upper part 5. To eject a molded block (not shown here) formed from the material 16, the mold lower part 4 is raised vertically upwardly into the arrow direction x, with the molded block being prevented from making an upward movement in the arrow direction x by the pressure piece 17. The molded block completely demolded from the mold cavity 11 is then removed from the block molding machine 1 on the production board 8. The mold lower part 4 and the mold upper part 5 then move back into the position shown in FIG. 1a.

Figure 1B:
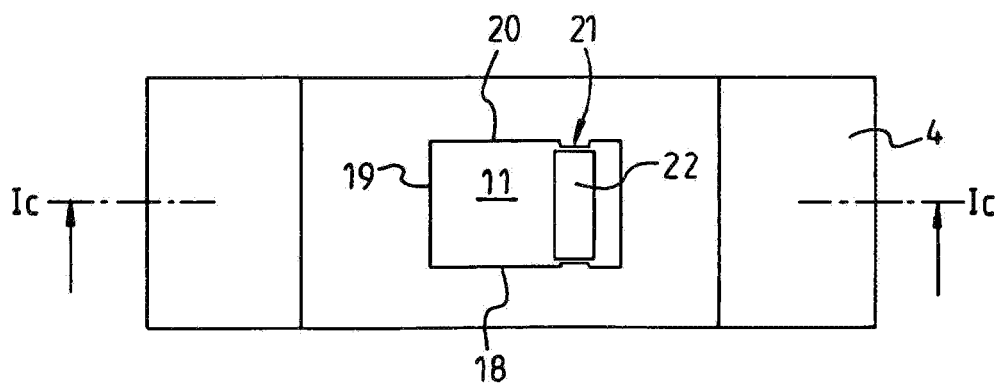
FIG. 1b shows the mold lower part of the mold in plan view.

FIG. 1b depicts in plan view the mold lower part 4 shown in FIG. 1a. It can be seen in this view that one of four mold walls 18 to 21 is enclosed by a flexible belt 22. According to the invention, it is also provided that a plurality of mold walls are completely or partially enclosed by flexible belts.

Figure 1C:
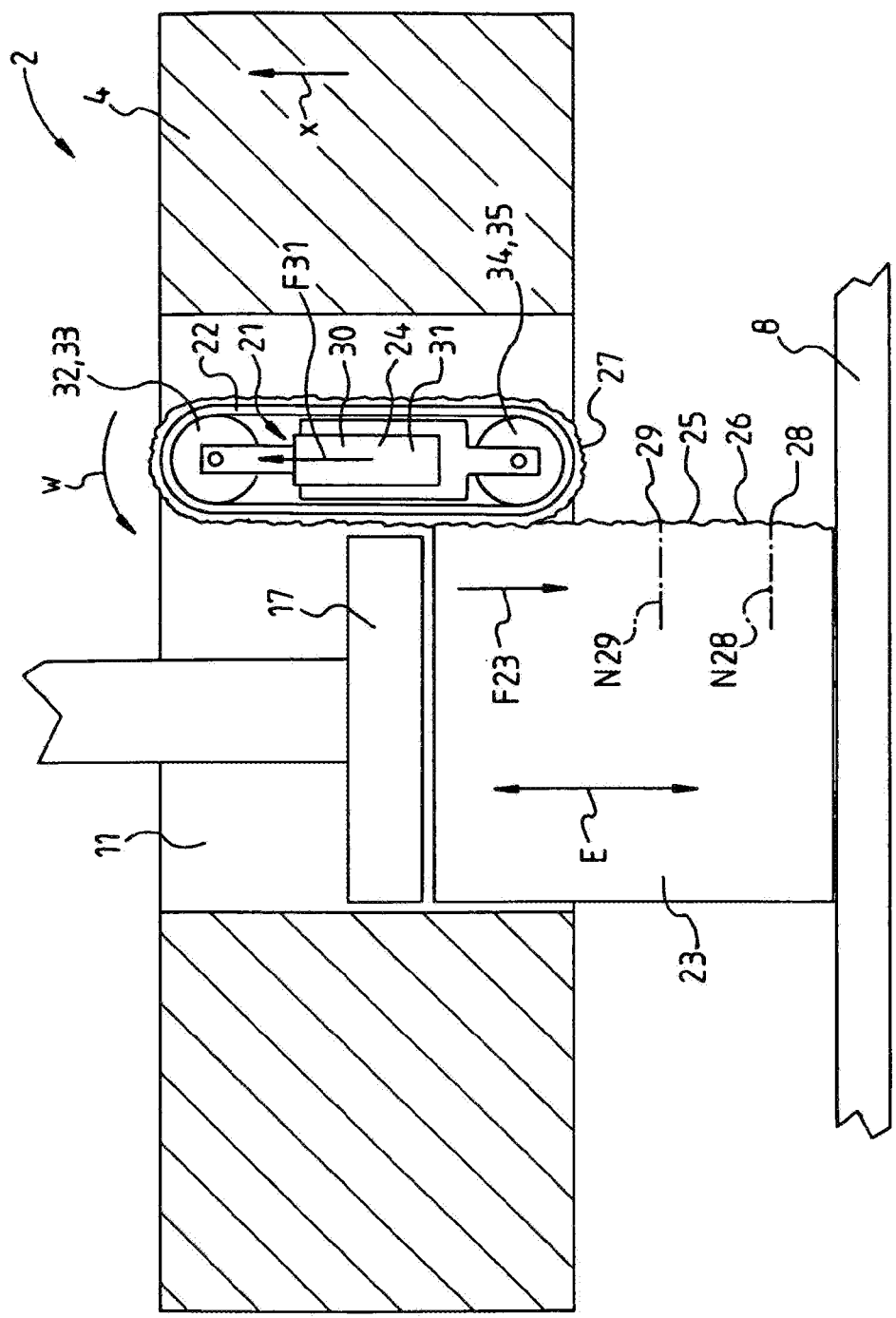
FIG. 1c shows a section through the mold lower part shown in FIG. 1b.

In the sectional view shown in FIG. 1c, which shows the mold lower part 4 corresponding to the section line Ic-Ic indicated in FIG. 1b, it can be seen how the flexible belt 22 runs around the mold wall 21 as an endless belt or as a loop which can be rotated around the mold wall 21 or can be rolled around the mold wall 21. This sectional view now depicts the molded block 23 mentioned for the purposes of illustration. Here, the molded block 23 is shown during demolding or stripping, with the molded block 23 being held by the pressure piece 17 on the production board 8 and the mold lower part 4 moving upwardly in the arrow direction x. To facilitate and optimize this stripping process, the mold 2 or the mold lower part 4 or the mold wall 21 comprises an active auxiliary device 24 by means of which it is possible to reduce a rolling resistance which the flexible belt 22 has during a rotation in a counterclockwise direction of rotation w about the mold wall 21, in order to keep low a drive force F23 which the molded block 23 has to transmit to the flexible belt 22, and to make possible a destruction-free ejection or stripping of the molded block 23. For the purposes of the invention, a molded block 23 stripped in a destruction-free manner is intended to mean a molded block 23 which has on a lateral face 25 a texture 26 which is formed as a negative of a texture 27 of the flexible belt 22, wherein the pattern impressed during the production is obtained largely nondeformed after stripping, and in particular elevations 28 and depressions 29 of the texture 26, the normals N28 and N29 of which are perpendicular to a direction E of the demolding, are not substantially deformed during the demolding operation. For this purpose, the active auxiliary device 24 comprises a tensioning device 30. This substantially comprises a pneumatically or hydraulically operated cylinder 31 and a tensioning means 32 which is formed in particular by at least one tensioning roller 33. For stripping, a tensioning force F31 with which the cylinder 31 presses the tensioning means 32 in the arrow direction x is then reduced, with the result that the drive force F23 which the molded block 23 must transmit via its texture 26 to the flexible belt 22 in order to rotate the latter around the mold wall 21 is reduced to such an extent that the still soft texture 26 of the molded block 23 does not experience any visible deformation which impairs the desired appearance of the molded block 23 as a result of the driving of the belt 22 during the stripping operation. In order to compact or fill and compact the mold cavity 11 with material, the flexible belt 22 is then tensioned again by the tensioning device 30 against a deflection means 34, wherein the deflection means 34 is formed by at least one deflection roller 35. This ensures that the belt 22 maintains its position during filling and compaction and is not displaced and that the belt runs in the mold cavity 11 without waves or bulges. Consequently, the active auxiliary device 24 makes it possible for the flexible belt 22 to be able to meet the different requirements for the individual manufacturing steps. Namely, the belt 22 is tightly tensioned and can be displaced with difficulty during filling and compaction, and the belt 22 can run around the mold wall 21 with minimum resistance during stripping.

FIGS. 2a to 2d show a second exemplary embodiment of an active auxiliary device 24 which comprises a tensioning device 30. To clearly illustrate the auxiliary device 24, substantially only one partition wall 21, which is enclosed by a flexible belt 22, is shown of a mold lower part 4. This partition wall 21 is, for example, screwed to the remaining structure 36 of the mold lower part 4, the structure being indicated here only in FIGS. 2a and 2c. FIGS. 2a and 2b illustrate the partition wall 21 with a completely relaxed flexible belt 22, with, of course, the belt 22 bulging into a mold cavity 11 only—as shown—when no molded block is present in the mold cavity 11. In the sectional view through FIG. 2a, which is shown in FIG. 2b, it can be seen that a tensioning means 32 is designed as a tensioning slide 37. FIGS. 2c and 2d show the flexible belt 22 in a tensioned position in which the tensioning slide 37 tensions the belt 22 against a deflection roller 35 and for this purpose has been moved downwardly in the arrow direction x. In the tensioned position, the belt 22 then runs flat without bulging, apart from its texture 27, in the region of the mold cavity 11.

Figure 3D:
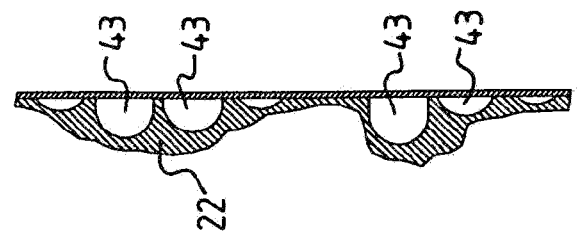

FIGS. 3a to 3h show a third exemplary embodiment of an active auxiliary device 24 which comprises a tensioning device 30. To clearly illustrate the auxiliary device 24, substantially only a partition wall 21, which is enclosed in FIGS. 3e and 3g by a flexible belt 22, is shown of a mold lower part 4. FIG. 3a shows a section through the partition wall 21, with, for illustrative purposes, a representation of a flexible belt which surrounds the partition wall 21 having initially been dispensed with. As is evident from the side view shown in FIG. 3b, the tensioning device 30 comprises three pneumatically operated cylinders 31 which each move a tensioning slide 37. To the sides of the outer tensioning slides 37 and between the tensioning slides 37, there are arranged four running rollers 38 on the partition wall 21. By means of the cylinders 31 the tensioning slides 37 can be lowered from a level I in which they are above the running rollers 38 to a level II in which the tensioning slides 37 are below the running rollers 38.

Figure 3C:
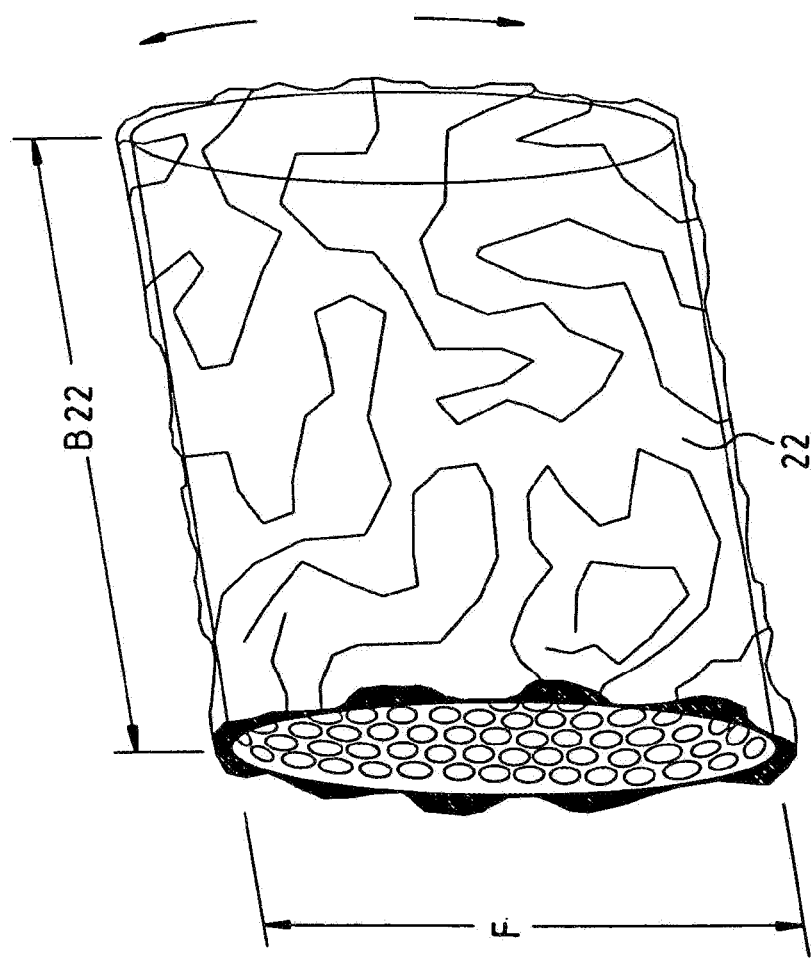

FIGS. 3c and 3d now show the already-mentioned flexible belt 22 in a perspective single view and in a detail view. The flexible belt 22 has a width B22 and is tensioned in its tensioned position with a tensioning force F by the active auxiliary device 24. Provision is made here for the tensioning force F to be located in a region which, depending on the width B22, is approximately between the value F=50 N/cm×B22 and the value F=100 N/cm×B22. Consequently, for a flexible belt with a width of 50 cm, tensioning forces between 2,500 N to 5,000 N are obtained.

FIG. 3d shows a section through the belt 22 in a schematic representation. The belt 22 consists of two layers 39 and 40 connected to one another. The inner layer 39 is designed as a sliding belt 41 having a uniform thickness D39 in order to ensure a smooth and jolt-free running of the flexible belt 22. The outer layer 40 forms as a relief belt 42 a texture 27 which is transmitted to the molded block. In order to keep the belt 22 uniformly flexible in spite of the differences between its maximum thickness D22 and its minimum thickness d22, the belt 22 has cavities 43 which reduce the wall thickness in certain portions and thus increase the flexibility of the belt 22. The two layers 39 and 40 of the belt 22 are connected to one another securely against displacement.

Analogously to the illustrations of FIGS. 3a and 3b, in FIGS. 3e and 3f the tensioning slides 37 are now lowered to the level 22 such that the running rollers 38 project beyond the tensioning slides 37. As a result, the flexible belt 22 which is shown in FIG. 3e can be rolled over the running rollers 38 in the relaxed position and thus can be rotated or rolled particularly easily around the partition wall 11 in the relaxed position.

Figure 3H:
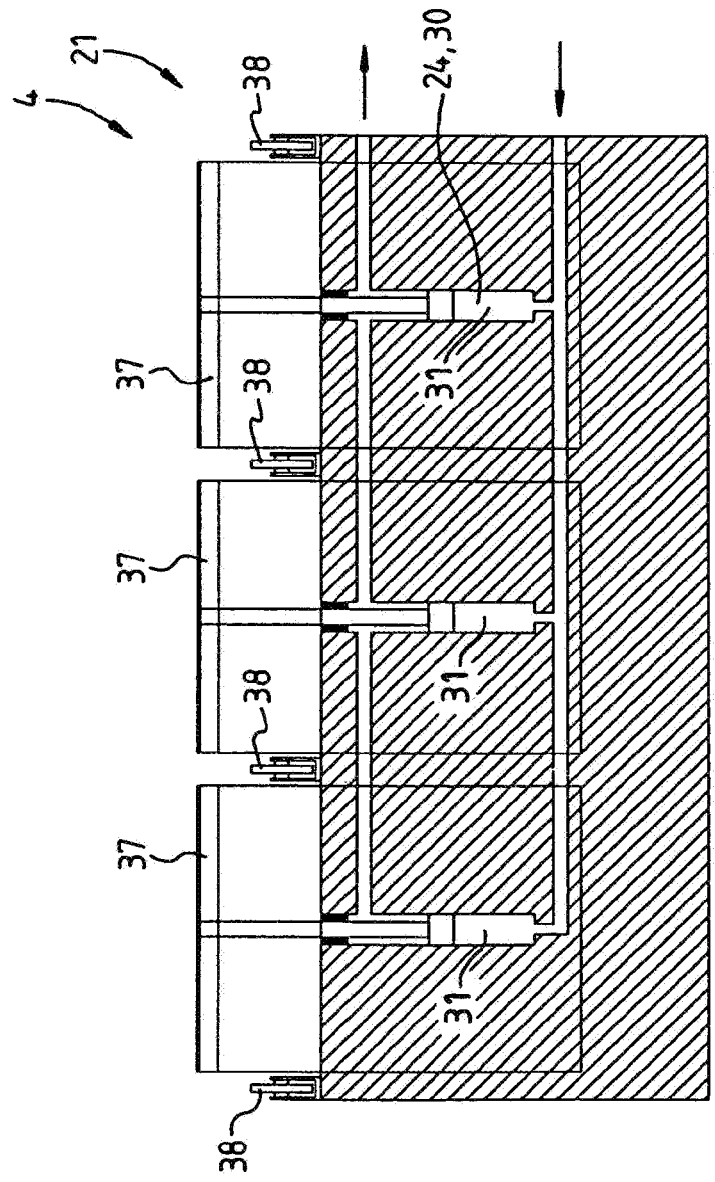
Figure 3G:
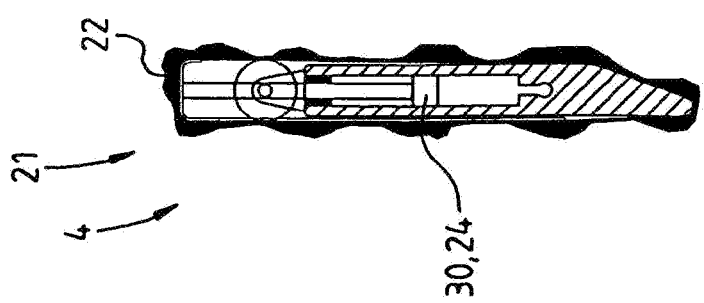

In the tensioned position—as is illustrated again in FIGS. 3g and 3h—the flexible belt 22 is tensioned by the three tensioning slides 37 and is here lifted off by them from the running rollers 38 such that it is made more difficult for the belt 22 in the tensioned position to run around the partition wall 21 as a result of the increased tension and the increased friction. To strip or eject a molded block, the active auxiliary device 24 is then relaxed such that the flexible belt can run around the partition wall 21 over the running rollers 28 without or with little tension.

Figure 4:
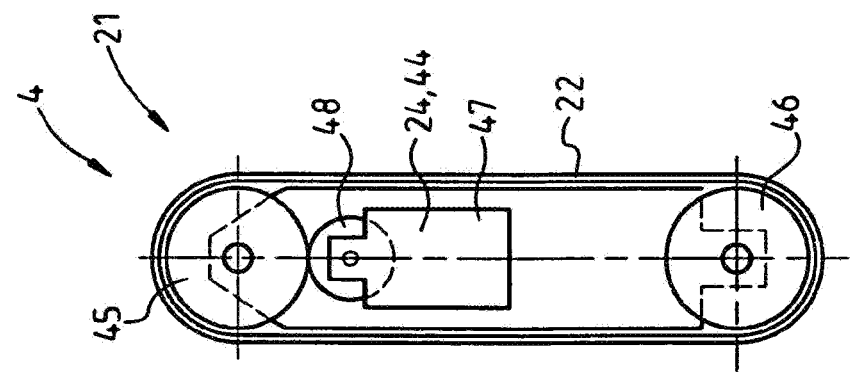
FIG. 4 shows an exemplary embodiment of an active auxiliary device which comprises a drive device.

FIG. 4 shows an exemplary embodiment of an active auxiliary device 24 which comprises a drive device 44. To clearly illustrate the auxiliary device 24, substantially only a partition wall 21, which is enclosed by a flexible belt 22, is shown of a mold lower part 4. The flexible belt 22 which surrounds the partition wall 21 is pretensioned over two deflection rollers 45 and 46. The drive device 44 comprises a pneumatically, hydraulically or electrically driven motor 47 which moves a friction wheel or a drive roller 48 which acts on the upper deflection roller 45. For stripping or ejecting a shaped block (not shown), the belt 22 is driven over the upper deflection roller 45 corresponding to the demolding rate such that the molded block does not have to transmit any drive forces which impair the quality of its texture. The drive device 44 further offers the possibility, given a corresponding design, for example, of a gearing, to block the belt 22 during filling and compaction.

Figure 5:
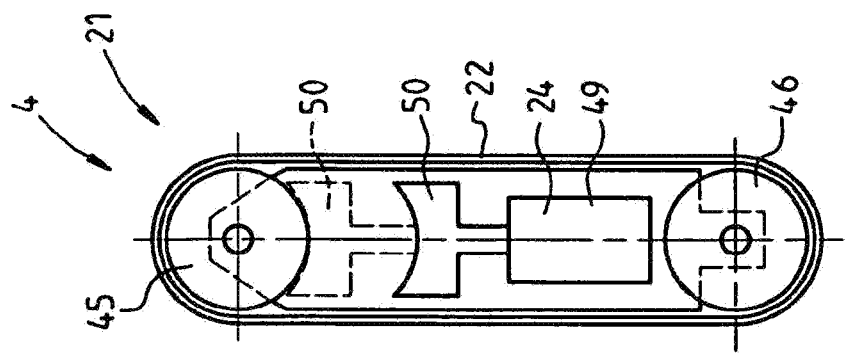
FIG. 5 shows an exemplary embodiment of an active auxiliary device which comprises a braking device.

FIG. 5 shows an exemplary embodiment of an active auxiliary device 24 which comprises a braking device 49. To clearly illustrate the auxiliary device 24, substantially only a partition wall 21, which is enclosed by a flexible belt 22, is shown of a mold lower part 4. The flexible belt 22 which surrounds the partition wall 21 is pretensioned over two deflection rollers 45 and 46. By selecting smooth-running bearings for the deflection rollers 45, 46, only a very small drive force is necessary to be able to rotate the belt 22 around the mold wall 21. As a result, it is possible, during stripping, to drive the belt 22 by means of the positive connection between the texture of the molded block and the texture of the belt when the braking device 49 is released. Correspondingly, for filling and compaction, the belt 22 is blocked by the braking device 49 in order to avoid an unwanted movement. The braking device 49 comprises a brake shoe 50 which can be moved by means of a cylinder 31 for braking against the upper deflection roller 45. This is indicated by dashed lines. To release the belt 22, the brake shoe 50 can be withdrawn from the upper deflection roller.

Figure 6A:
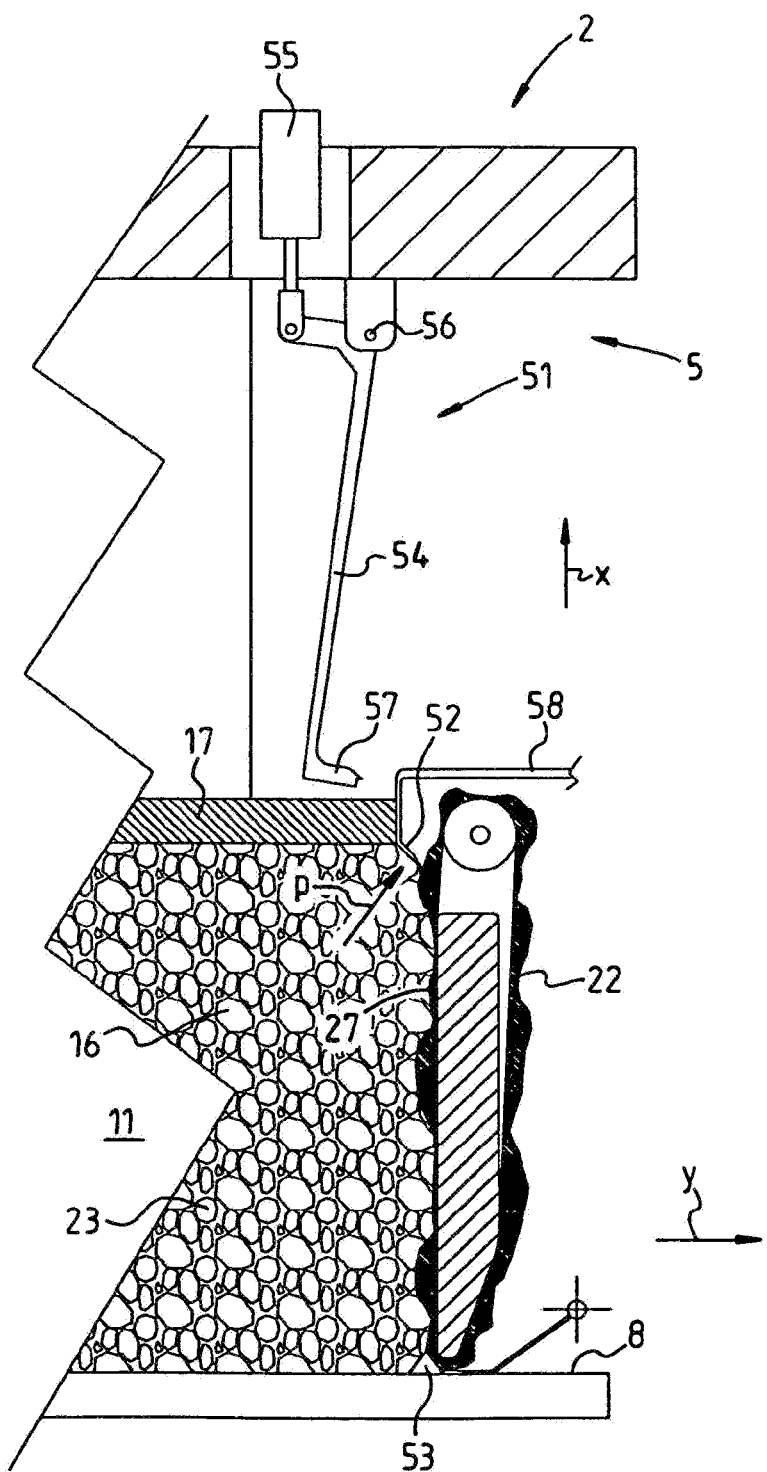
FIG. 6a-6c show a mold with a scraping device, a seal and a strip.
Figure 6B:
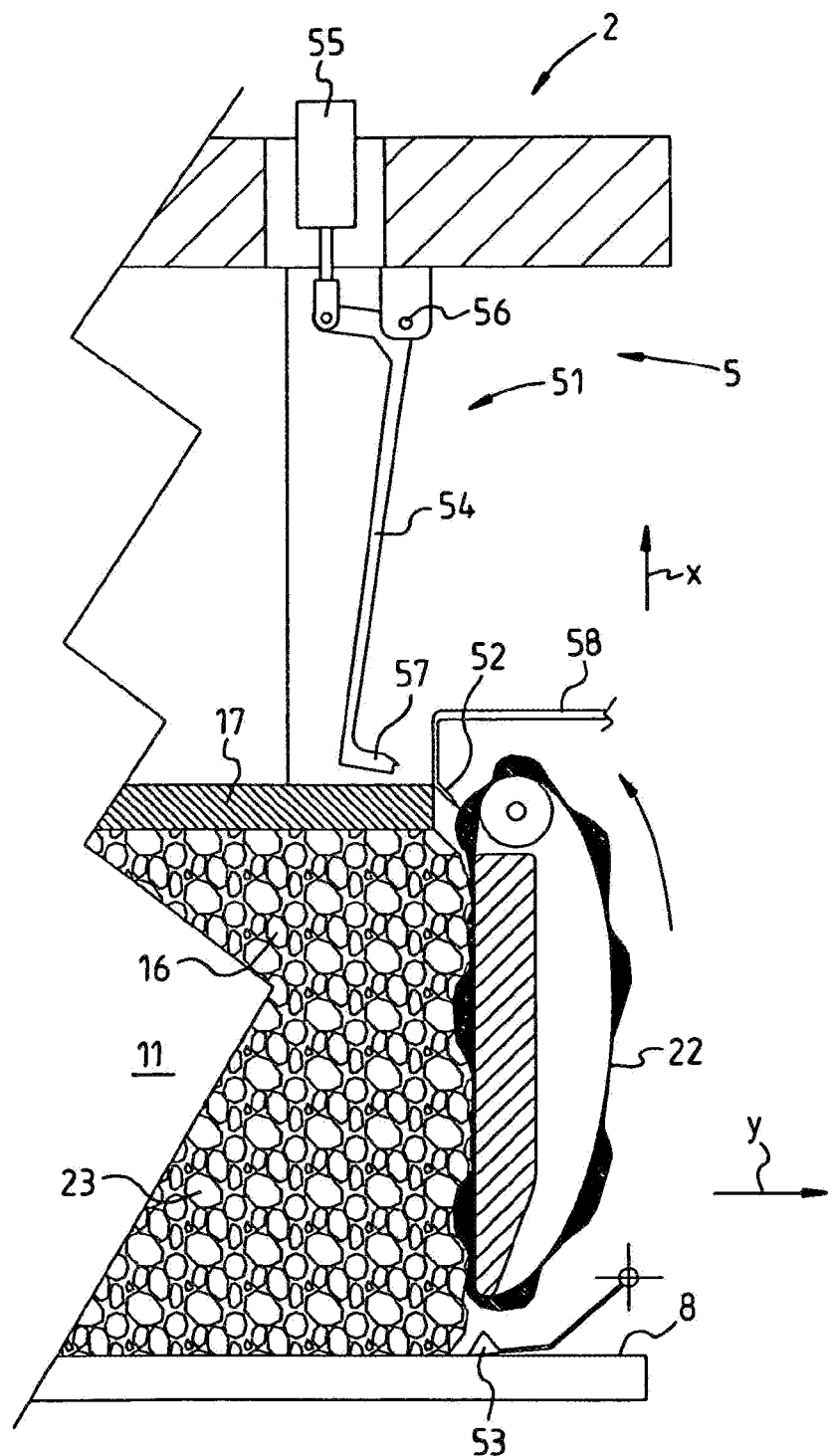
Figure 6C:
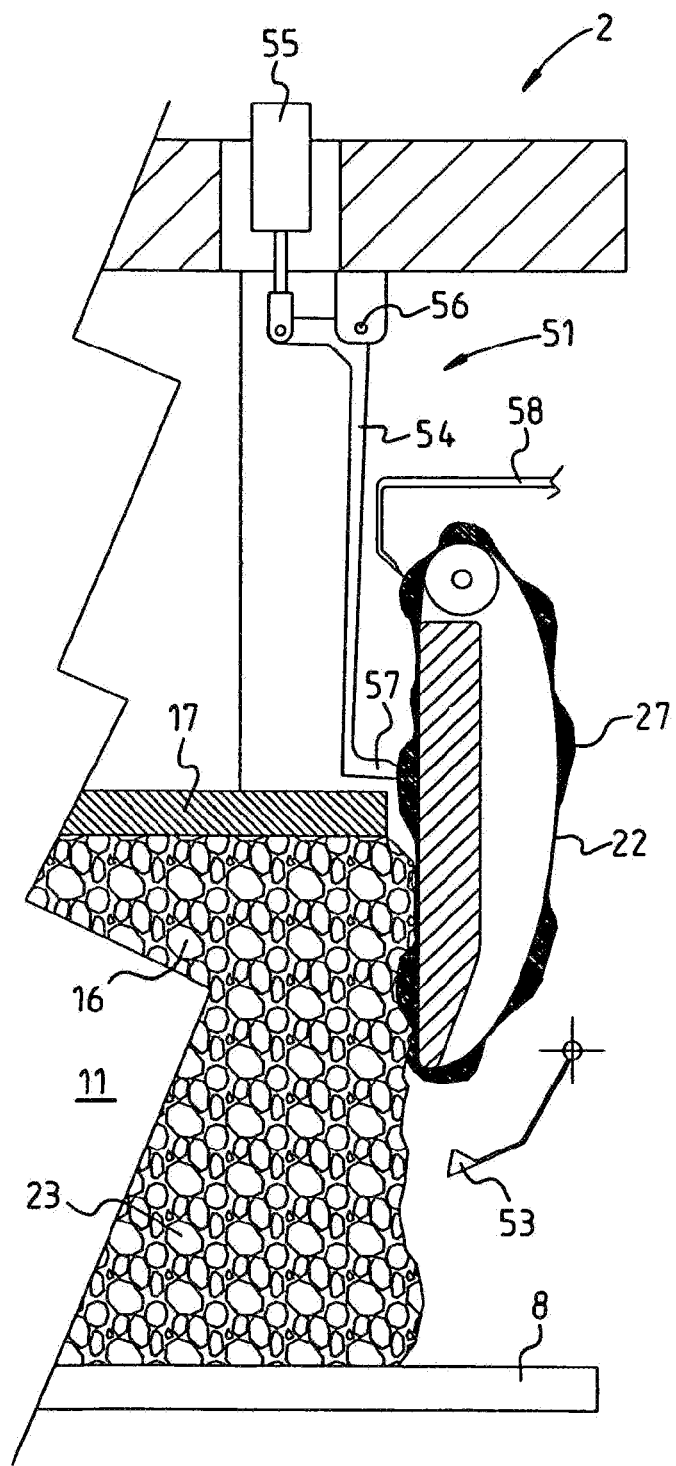

FIGS. 6a to 6c show in various positions a mold 2 with a pressing device 51, a seal 52 and a strip 53. The pressing device 51 comprises a lever 54 which bears against a flexible belt 22 of the mold 2 during the stripping operation in order to ensure a uniform running of the flexible belt 22 during demolding. For this purpose, the lever 54 is pivotably attached to a mold upper part 5 of the mold 2 and, during the filling and during the compaction, is situated in a protected position above a pressure plate 17 which compacts material 16 in the mold cavity 11 to form a molded block 23. As soon as the flexible belt 22 moves upwardly in the arrow direction x past the pressure plate 17 during demolding and comes into an action region of the lever 54, the lever is pivoted by means of a pneumatic cylinder 55 about a rotary bearing 56 with its contact end 57 against the flexible belt 22 and holds the latter in position during the further rotation by means of pressure. The seal 52 is fastened to a cover plate 58 which is positioned between the pressure piece 17 and the flexible belt 22 during compaction. By means of a pressure p with which the material 16 which is compacted acts on the lip-shaped seal 52, the latter bears against an irregular texture 27 of the belt 22 and brings about sealing during the compaction operation. Between a production board 8 and the flexible belt 22, use is made of a strip 53 in a mold cavity 11 of the mold 2, the strip being positioned prior to a filling of the mold cavity 11. A bevel is formed on the resulting molded block 23 by means of the strip 53 and consequently the formation of a widening of the molded block 23 in the arrow direction y toward the flexible belt 22 is prevented.

The invention is not limited to illustrated or described exemplary embodiments. Rather, it comprises developments of the invention within the scope of the claims.

LIST OF REFERENCE SIGNS

1 Block molding machine
2 Mold
3 Device
4 Mold lower part
5 Mold upper part
6 Mold bed
7 Vibrating table
8 Production board
9 Load
10 Column
11 Mold cavity
12, 13 End of 4
14 Upper opening of 11
15 Lower opening of 11
16 Material
17 Pressure piece
18-21 Mold walls
22 Flexible belt
23 Molded block
24 Active auxiliary device
25 Lateral face
26 Texture of 23
27 Texture of 22
28 Elevations of 26
29 Depressions of 26
30 Tensioning device
31 Cylinder
32 Tensioning means
33 Tensioning roller
34 Deflection means
35 Deflection roller
36 Structure 3
37 Tensioning slide
38 Running roller
39 Inner layer
40 Outer layer
41 Sliding belt
42 Relief belt
43 Cavity
44 Drive device
45, 46 Deflection rollers
47 Motor
48 Drive roller, friction wheel
49 Braking device
50 Brake shoe
51 Pressing device
52 Seal
53 Strip
54 Lever
55 Pneumatic cylinder
56 Rotary bearing
54 Contact end of 54
58 Cover plate 58
B22 Width of 22
D39 Thickness of 39
D22 Maximum thickness of 22
d22 minimum thickness of 22
E Direction of demolding F Tensioning force
F23 Drive force of 23 on 22
F31 Tensioning force
N28, N29 Normal of 28 or 29
p Pressure of 16 on 52
x, x' Vertical directions
y Arrow direction
I Level of 37
II Level of 37

We claim:

1. A mold for producing molded blocks with at least one lateral face which has a texture, the mold comprising:
   a mold lower part which comprises a mold cavity which has openings at its-opposite ends of the mold cavity in order to receive a material for producing a molded block through an upper opening of the mold cavity and to discharge through a lower opening of the mold cavity the molded block formed in the mold cavity from the material;
   at least one flexible belt, wherein the flexible belt surrounding at least one mold wall of the mold lower part that delimits the mold cavity in order to act on the material for producing the molded block that is received in the mold cavity, and in order in so doing to impress a texture on at least one of the lateral faces of the molded block, the flexible belt being moveable relative to the mold lower part, and being mounted in such a way that the flexible belt moves around the mold wall when the molded block is ejected from the mold cavity;
   an active auxiliary device by means of which a rolling resistance of the flexible belt can be varied; the active auxiliary device comprising:
      a pressing device which bears against the flexible belt when the molded block is ejected from the mold cavity.

2. The mold as claimed in claim 1, wherein the active auxiliary device comprises a tensioning device by means of which a tension of the flexible belt can be varied, wherein the flexible belt is held in a tensioned position during a filling of the mold cavity and during a compaction of the material in the mold cavity, and wherein the flexible belt is loosened into a relaxed position by the tensioning device during the stripping or ejection from the mold cavity of the molded block formed from the material.

3. The mold as claimed in claim 1, wherein the active auxiliary device comprises a drive device by means of which the flexible belt is driven during the stripping or ejection from the mold cavity of the molded block formed from the material, wherein the drive device comprises at least one drive means which is formed in as a drive roller.

4. The mold as claimed in claim 1, wherein the active auxiliary device comprises a braking device by means of which the flexible belt is blocked during filling and compaction or braked and by means of which the flexible belt is released in its rotation about the mold wall during the stripping or ejection of the molded block formed from the material.

5. The mold as claimed in claim 1, wherein the flexible belt has cavities arranged in regions in which a thickness of the flexible belt lies above an average thickness of the flexible belt.

6. The mold as claimed in claim 5, wherein the cavities reduce a total wall thickness of each region in which the cavities are arranged, the reduction being relative to the wall thickness of each region if no cavities existed.

7. The mold as claimed in claim 1, wherein round cords are embedded in the flexible belt and run annularly around the mold wall which the belt surrounds, wherein the round cords are embedded over the whole width of the flexible belt and have identical spaces from one another.

8. The mold as claimed in claim 1, wherein the flexible belt has a first inner layer and a second outer layer, wherein the outer layer forms a texture and wherein the inner layer forms a sliding belt with a uniform thickness.

9. The mold as claimed in claim 1, wherein the mold comprises a seal which bears against the flexible belt in a region of the upper opening of the mold cavity in order to upwardly seal the mold cavity filled with material together with a pressure piece acting on the material.

10. The mold as claimed in claim 1, wherein the mold comprises a strip which, during filling and compaction, seals the lower opening of the mold cavity toward the mold wall which is surrounded by the flexible belt, and forms a bevel on the resulting molded block, wherein the strip is moved out of the mold cavity for stripping the molded block.

11. The mold as claimed in claim 1, wherein the flexible belt has cavities arranged in regions in which a thickness of the flexible belt is more than 1.5 times the average thickness of the flexible belt.

12. The mold as claimed in claim 1, wherein the flexible belt comprises:
   a first layer;
   a second layer connected to the first layer; and
   at least one cavity arranged between the first layer and the second layer, each cavity reducing a wall thickness of the second layer at the location of the cavity, the reduction being relative to the wall thickness of each location if no cavities existed.

13. A device for producing molded blocks comprising a block molding machine and a mold with a mold lower part corresponding to claim 1 for use in the block molding machine and a mold upper part, wherein the block molding machine comprises a vibrating table on which the mold lower part rests during filling and compaction, wherein the block molding machine comprises a vertically moveable load to which the mold upper part is fastened, wherein the mold lower part can likewise be moved in the vertical direction by the block molding machine.

14. A mold for producing molded blocks with at least one lateral face which has a texture, the mold comprising:
   a mold lower part which comprises a mold cavity which has openings at opposite ends of the mold cavity in order to receive a material for producing a molded block through an upper opening of the mold cavity and to discharge through a lower opening of the mold cavity the molded block formed in the mold cavity from the material;
   at least one flexible belt, the flexible belt surrounding at least one mold wall of the mold lower part that delimits the mold cavity in order to act on the material for producing the molded block that is received in the mold cavity, and in order in so doing to impress a texture on at least one of the lateral faces of the molded block, the flexible belt being moveable relative to the mold lower part, and being mounted in such a way that the flexible belt moves around the mold wall when the molded block is ejected from the mold cavity,
   the flexible belt varying in thickness and comprising a plurality of cavities to facilitate uniformity in flexibility despite the flexible belt varying in thickness.

15. The mold as claimed in claim 14, wherein the cavities reduce a total wall thickness of each region in which the cavities are arranged, the reduction being relative to the wall thickness of each region if no cavities existed.

16. The mold as claimed in claim 14, wherein the flexible belt comprises:
   a first layer; and
   a second layer connected to the first layer,
   at least one of the cavities being arranged between the first layer and the second layer in a region in which a thickness of the flexible belt is more than an average thickness of the flexible belt.

17. A flexible belt for a mold for producing a molded block, the flexible belt comprising:
   a first side which has a texture in order to impress a texture on at least one face of the molded block;
   a second side opposite the first side, a thickness defined between the first side and the second side, the thickness varying between a minimum thickness and a maximum thickness; and
   a plurality of cavities to facilitate uniformity in the flexibility of the belt despite the thickness of the belt varying.

18. The flexible belt as claimed in claim 17, wherein the cavities reduce a total wall thickness of each region in which the cavities are arranged, the reduction being relative to the wall thickness of each region if no cavities existed.

19. The flexible belt as claimed in claim 18, wherein the flexible belt comprises:
   a first layer; and
   a second layer connected to the first layer,
   at least one cavity being arranged between the first layer and the second layer in a region in which a thickness of the flexible belt is more than an average thickness of the flexible belt.

20. The flexible belt as claimed in claim 19, wherein each cavity reduces a wall thickness of the second layer at the location of the cavity, the reduction being relative to the wall thickness of the second layer at each region if no cavities existed.

* * * * *